C. R. & O. O. KELLER.
BEAN HARVESTER.
APPLICATION FILED DEC. 4, 1911.
1,058,757.
Patented Apr. 15, 1913.
4 SHEETS—SHEET 1.
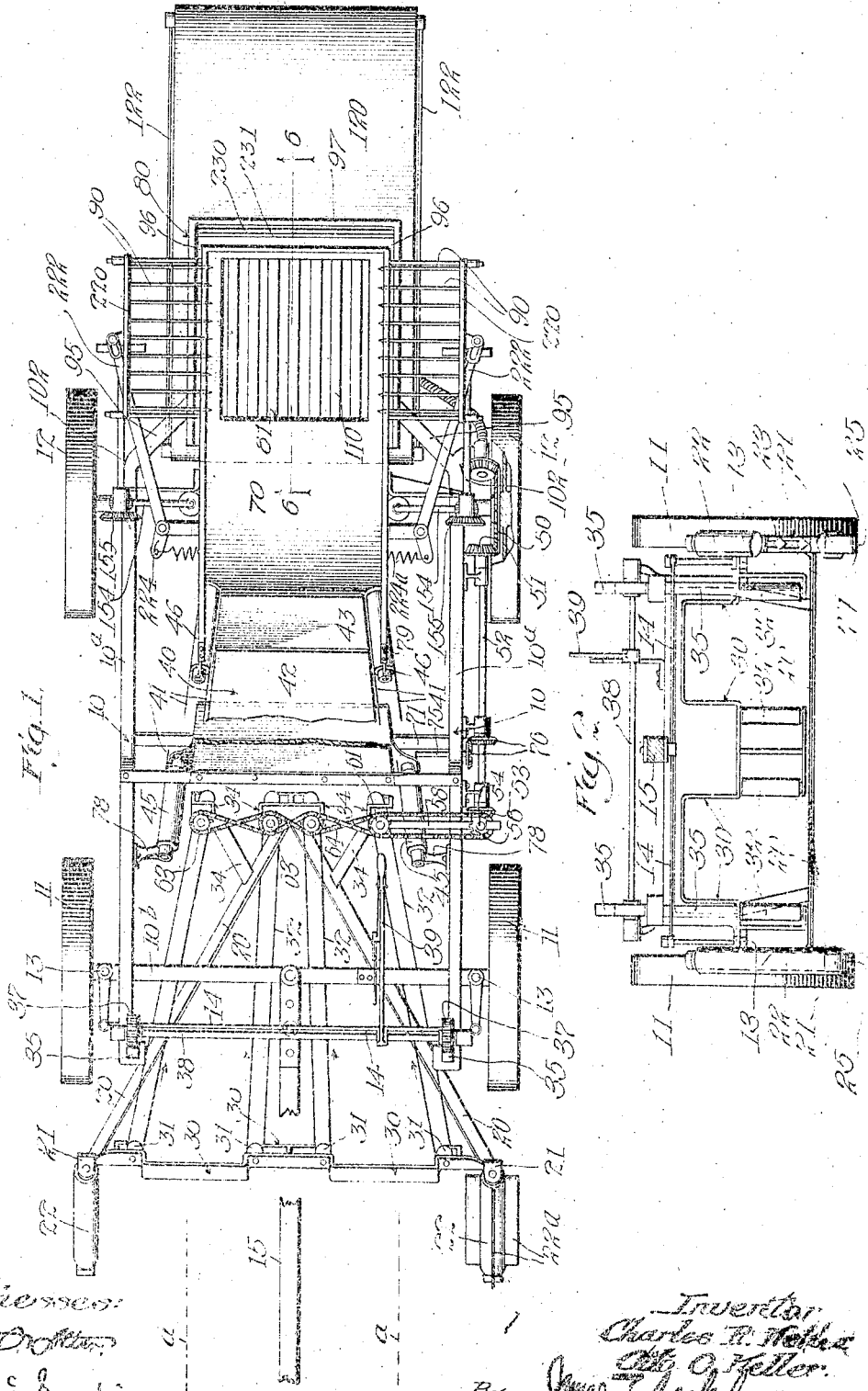

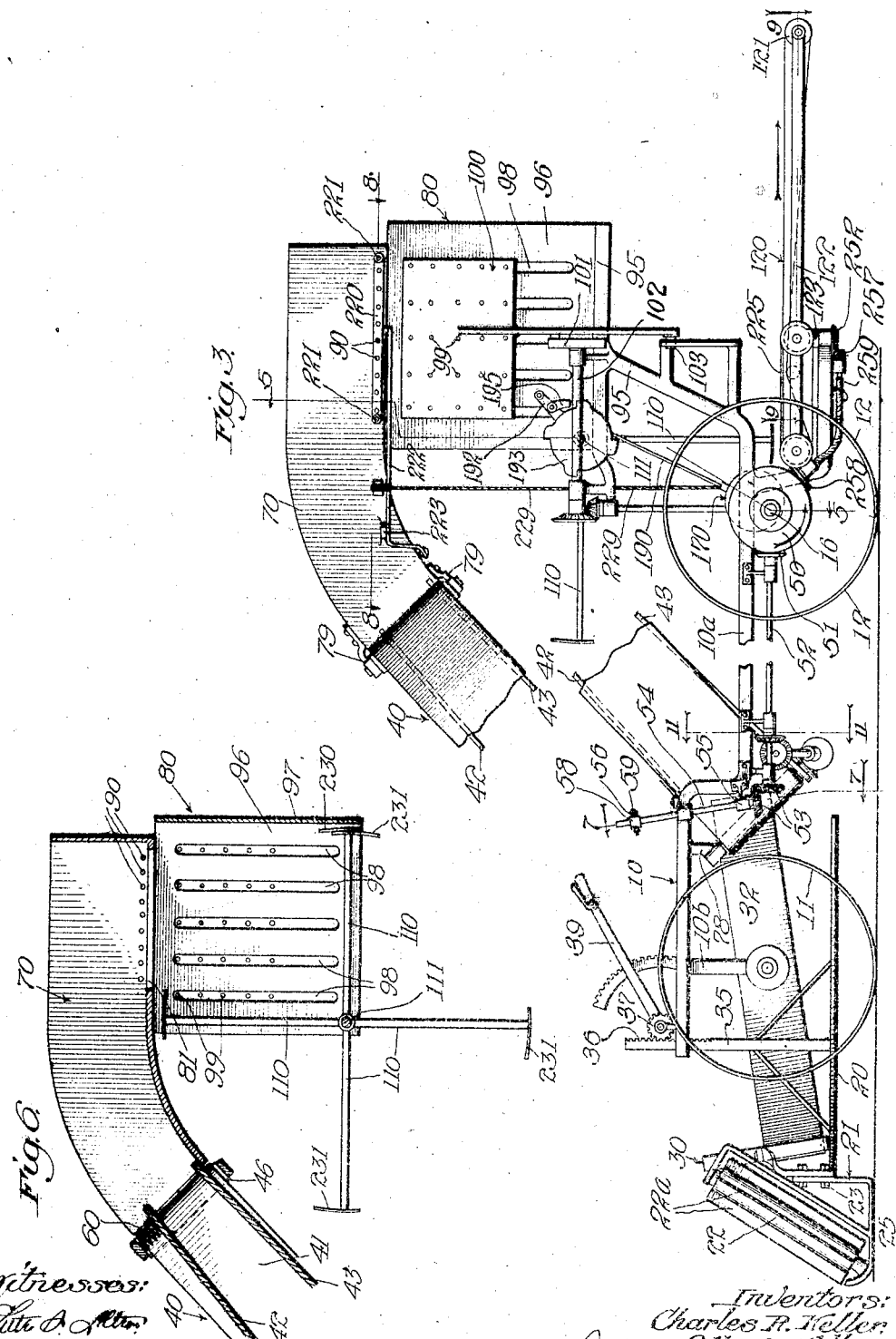

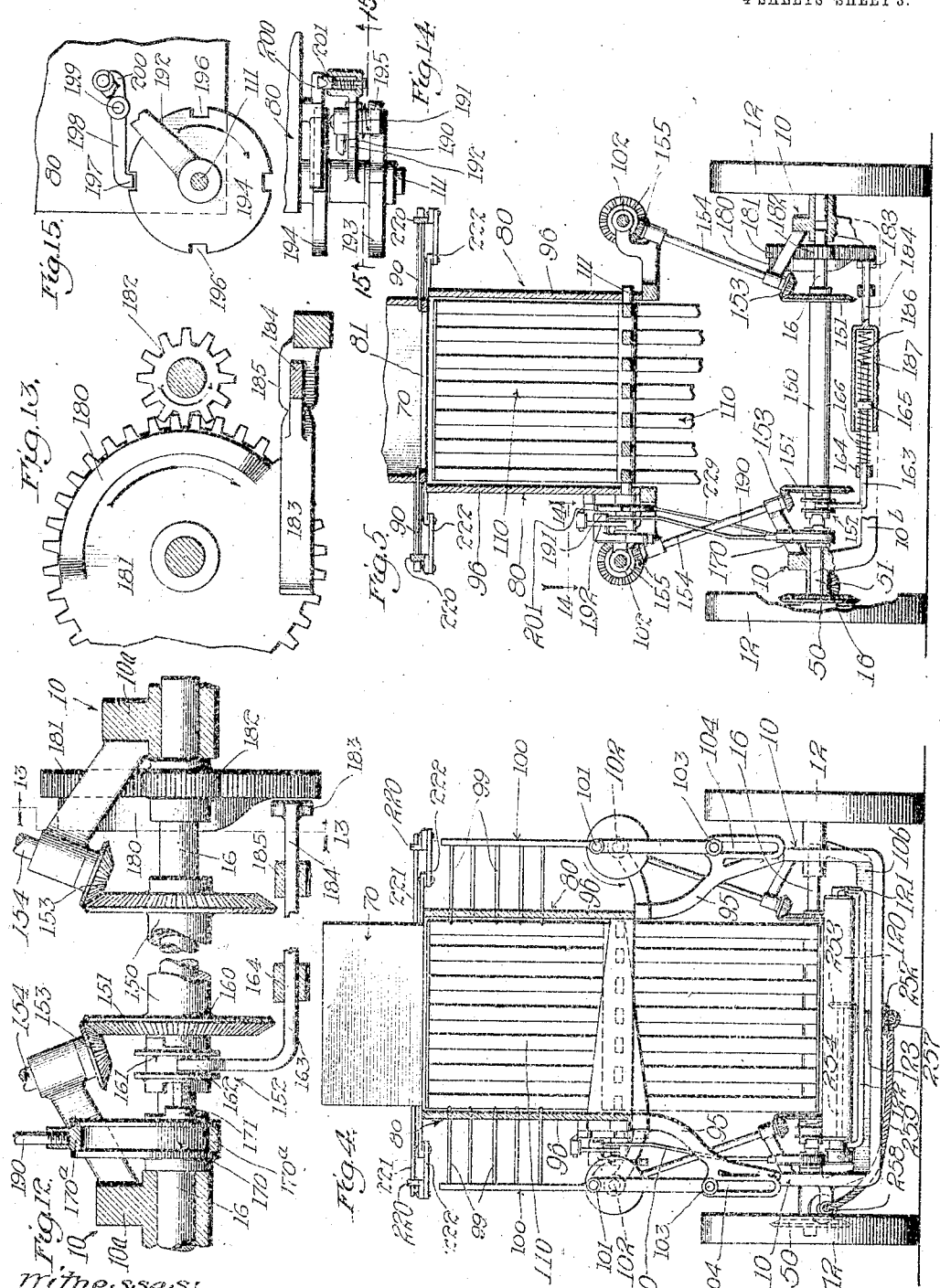

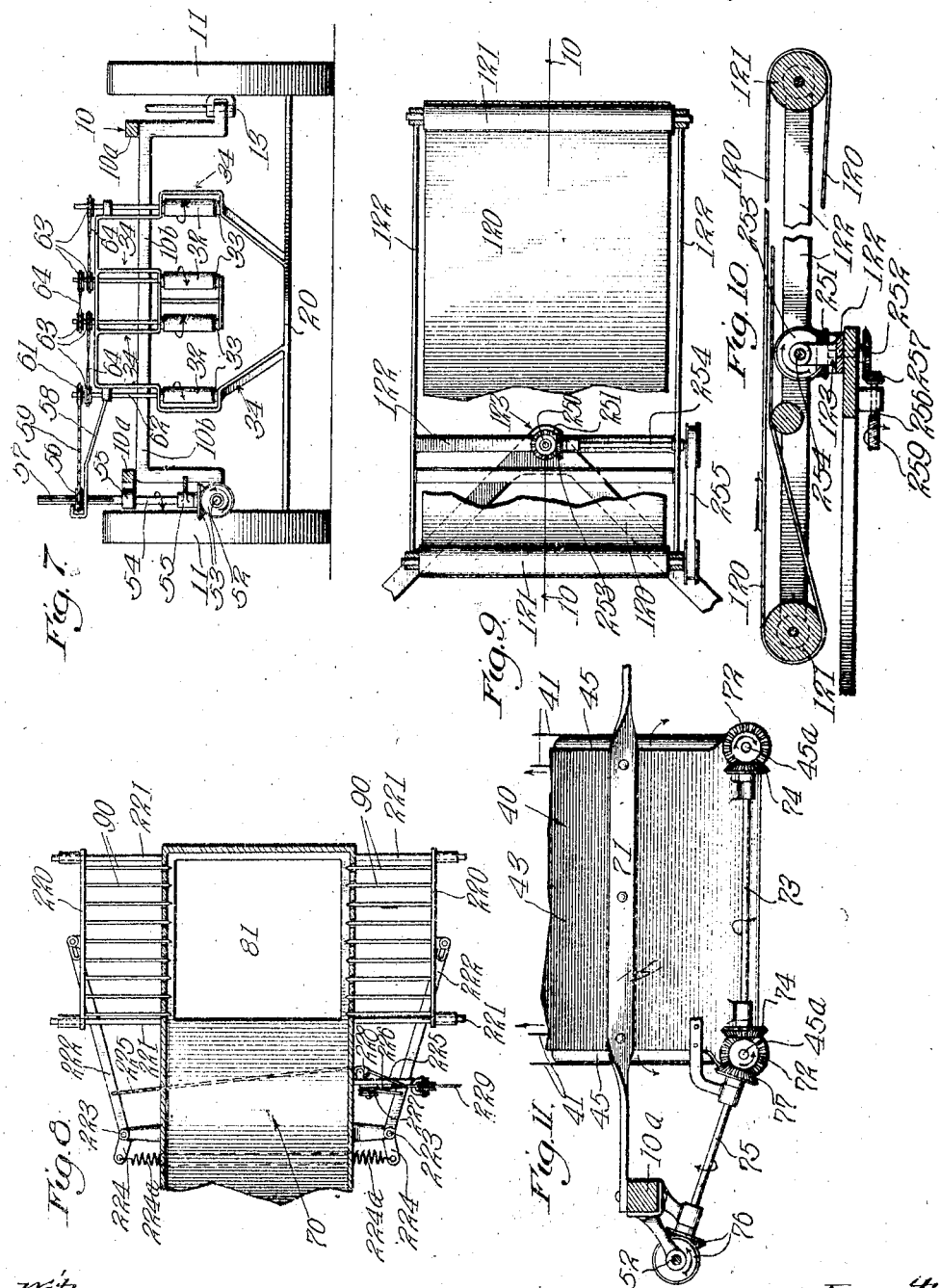

UNITED STATES PATENT OFFICE.

CHARLES R. KELLER, OF OXNARD, AND OTTO C. KELLER, OF SANTA PAULA, CALIFORNIA.

BEAN-HARVESTER.

1,058,757.  Specification of Letters Patent.  Patented Apr. 15, 1913.

Application filed December 4, 1911. Serial No. 663,813.

*To all whom it may concern:*

Be it known that we, CHARLES R. KELLER and OTTO O. KELLER, citizens of the United States, residing, respectively, at Oxnard, in the county of Ventura, State of California, and Santa Paula, in the county of Ventura, State of California, have invented new and useful Improvements in Bean-Harvesters, of which the following is a specification.

This invention relates generally to improvements in our mechanisms described and claimed in our applications filed August 15th, 1911, and September 2nd, 1911, bearing Serial Nos. 644,194 and 647,324, respectively; and the invention relates specifically to certain subsidiary combinations of our now complete improved machine. Other subdivisions of this machine are treated in our application for bean harvesters filed March 5th, 1912, Serial No. 681,763. The features herein claimed are those having more directly to do with the bundling and delivery of the bean vines; while the other application deals with the mechanisms for gathering, cutting and conveying the vines.

In the accompanying drawings: Figure 1 is a plan view of our improved machine, parts being broken for convenience of illustration. Fig. 2 is a front elevation of the same. Fig. 3 is a side elevation of the same. Fig. 4 is a rear end elevation of the same. Fig. 5 is a vertical section taken as indicated by line 5—5 of Fig. 3. Fig. 6 is a longitudinal section taken on line 6—6 of Fig. 1. Fig. 7 is a cross section taken on line 7—7 of Fig. 3. Fig. 8 is a horizontal section taken on line 8—8 of Fig. 3. Fig. 9 is a horizontal section taken on line 9—9 of Fig. 3. Fig. 10 is a longitudinal vertical section taken on line 10—10 of Fig. 9. Fig. 11 is a detail section taken on line 11—11 of Fig. 3. Fig. 12 is a fragmentary enlargement of portions of Fig. 5. Fig. 13 is a section taken on line 13—13 of Fig. 12. Fig. 14 is an enlarged plan of a portion of the mechanism shown in Fig. 5, and taken as indicated by line 14—14 of that figure. Fig. 15 is a section taken on line 15—15 of Fig. 14.

In the drawings 10 designates a suitable frame, composed of longitudinal members 10ᵃ and transverse members 10ᵇ, supported on wheels 11 and 12, wheels 11 being preferably supported on individual pivots 13 and connected by rods 14 with tongue 15, through the medium of which tongue the whole machine is pulled over the ground. (This is for a horse drawn vehicle; a motor may be mounted on the machine to make it an automobile mechanism.) One of wheels 12 in the rear is rigidly mounted on a transverse shaft 16 from which power is obtained for driving the bundling and other mechanism of the machine.

At the forward end of the machine we have mounted a V-shaped bean cutting knife 20 which has adjustably attached to its forward ends small frames 21 supporting rollers 22 in a diagonal position as is shown in Fig. 2 and in a position directly in front of the forward ends of the knife 20 and in front of wheels 11. These rollers act to separate any entangled branches reaching from one row of bean vines to an adjacent row. The rows being supposedly cut by the machine are centered approximately on lines lettered *a* in Fig. 1. Frames 21 are adjustable vertically by means of bolts 23 in slots 24, so that the lower surface 25 of frames 21 may ride along the bottoms of the troughs between the hills on which the vines are growing. Knife 20 is placed sufficiently high to cut just beneath the surface of the tops of the hills. At the forward end of the knife 20 we have shown a transverse frame 30 which is of the configuration best illustrated in Figs. 1 and 2 and which supports rollers 31 over which conveyer belts 32 pass. There are four belts 32 so arranged that they will take up the bean vines on each side of the center of the knife (from each of the rows being cut) and will pass them rearwardly and at the same time pull them upwardly. For this purpose the belts 32 run slightly upwardly as is best shown in Fig. 2, so that the vines are gradually raised from the ground. This has the effect of straightening the vines out, rendering their cutting more easy, and of also lifting them free of any clods which might otherwise adhere. At the same time the vines are slightly compressed by the approach of the conveyer belts at their rear ends. The rear ends of belts 32 pass over rollers 33 which are mounted in a frame 34 (see Fig. 7) supported from the rear end of the knife 20.

The knife and the conveyers are all adjustably mounted on the main frame 10 of the machine so that they may be raised and lowered to adjust them to varying conditions; and particularly so that the knives and their parts may be raised when it is desired to turn at the end of a field or when it is desired to travel without operating the machine. The raising mechanism preferably consists, in two vertical rods 35 attached to the knife 20 at their lower ends and having rack teeth 36 at their upper ends. Pinions 37 mesh with the rack teeth and are mounted on a shaft 38 extending across the forward end of the frame 10. A hand lever 39 affords means for rotating the shaft 38 and pinions 37 and for raising and lowering rods 35 and the mechanisms attached thereto.

We have shown a preferred means of driving the conveyer belts from the rear wheel 12. On the rear wheel we have mounted a bevel gear 50 meshing with a gear 51 on longitudinal shaft 52. Shaft 52 is thus rotated in the direction indicated by the arrow in Fig. 7. At the forward end of shaft 52 gears 53 rotatively connect to a vertical shaft 54 in suitable bearings 55. A sprocket wheel 56 is slidably mounted on the upper end of this shaft, and at the same time rotatively secured thereto, by a key 57. A member 58 extending from the frame 34 moves the sprocket wheel 56 with the frame 34. A sprocket chain 59 connects wheel 56 with wheel 61 on the upper end of shaft 62 of one of rollers 33. Wheels 63, on this and the other shafts 62, and crossed chains 64 provide connections for operating all the conveyer belts as desired.

Immediately behind the conveyer belts 32 there is mounted a conveyer 40 which is comprised in two side belts 41 and in top and bottom boards 42 and 43. Belts 41 run on rollers 45 at the bottom and rollers 46 at the top. Bottom board 43 is preferably stationary; but top board 42 is preferably pressed toward board 43 by means of a spring 60. The two boards normally converge, as do the belts 41, so as to compress the bunches of beans as they are passing through the conveyer. The spring 60 allows for a certain amount of resiliency in the mechanism to prevent breakage should a large bunch of beans be forced through. At the upper end of the conveyer 40 the bean vines are discharged into a trough or other means 70, this trough leading to a point directly over bundling box 80. The trough has an opening 81 in its bottom and through this opening the bean vines drop into the bundling box 80. Directly above the opening 81 there is arranged a series of prongs 90 which are adapted to be forced across the opening 81 at a time when a bundle of beans is about to be ejected from the box 80 (explained hereinafter), thus preventing the bean vines from being pulled from trough 70 into the bundling box and facilitating the cutting of the vines.

Bottom board 43 of the conveyer is supported at its lower end on a transverse bar 71 secured to frame members 10ª. The lower ends of rollers 45 are journaled on this board, and the shafts 45ª of these rollers carry gears 72 beneath the board 43. A cross shaft 73 with gears 74 serves to rotatively connect gears 72; so that rollers 45 and the conveyer belts 41 are made to move in the correct relative directions. Driving of the mechanism is accomplished by a small shaft 75 having gearing connections 76 with shaft 52 and having a gear 77 meshing with gear 72. The upper ends of rollers 45 are journaled in supports 78 from frame members 10ª. Rollers 46 are journaled in brackets 79 mounted on the trough 70, the trough being supported directly on box 80.

Bundling box 80 is mounted on suitable frame extensions 95 and has only sides 96 and a rear end 97. Vertical slots 98 are cut in its sides 96 and through these slots prongs 99 project. Prongs 99 are mounted on members 100 whose upper ends move through an oval path with major axis horizontal. The members 100 are directly attached to cranks 101 which revolve around shafts 102, and the portions of the members 100 adjacent the cranks therefore receive a rotary motion. The lower ends of the members 100 are preferably provided with pins 103 which move vertically in slots 104, thus restricting the lower ends of the members to vertical reciprocation. When cranks 101 are rotated, the upper ends of the members 100 pass through a more or less elliptic or oval path with a longer horizontal than vertical diameter. Supposing the cranks to be rotating in the direction indicated by the arrows in Fig. 4, it will be seen that the prongs will move inwardly and downwardly in the box 80 and then will move downwardly and outwardly. This motion packs the bean vines into a more or less solid mass within the box. The bottom and the forward end of the box are formed by radial members 110 which are mounted on a shaft 111 at right angles to each other, there being four of these radial members, two of them within the box at any one time. Mechanism is provided so that the members will stop in the positions shown and will be moved through a quarter revolution at each operation of the machine. The beans fed into the box and resting upon horizontal member 110 are bunched together and then, by a suitable automatic action, the members 110 are turned through a quarter revolution and the bunch of bean vines will be dropped on to a belt 120 mounted on rollers 121 and traveling horizontally in the direction indicated. The movement of this belt will feed the bunch of beans out of the machine and will drop them upon the ground. The whole conveyer, of which belt 120 forms a part, is mounted upon a frame 122 which is pivoted at 123 so that the whole conveyer may be swung around in a horizontal direction and so that the rear end of the conveyer may be swung either to one side or the other of the machine. This provides that the bundles of beans may be dropped on to the ground either directly behind the machine or to one side or the other; and the beans cut from one pair of hills may be transferred over to be piled in a row with the bunches of beans from another pair of hills.

The mechanisms for causing the operations just described are best illustrated in Figs. 5 and 9 to 15. The shaft 16 extends across the frame 10 and it has mounted over its central portion a sleeve 150 carrying bevel gears 151 at each end. Sleeve 150 is loosely mounted on shaft 16 so that it is not ordinarily rotated therewith unless it is connected to the shaft through the medium of a clutch 152. Gears 153 mesh with gears 151 and cause the rotation of shafts 154. Shafts 154 connect, through gears 155, with shafts 102, these last mentioned shafts carrying the cranks 101. The gearing arrangements are preferably such that the ratio of revolution of crank shafts 102 to those of sleeve 150 is measured by a whole number; although this is not necessarily the case.

Sleeve 150 is connected to shaft 16 through the medium of clutch 152; this clutch comprising a member 160 on the sleeve 150 and a coöperating sliding member 161 on shaft 16 and slidably keyed thereto. Member 161 is moved longitudinally on shaft 16 through the medium of a longitudinally sliding yoke 162 mounted on a rod 163. Rod 163 is mounted in a single bearing 164 on frame member 16ᵇ and a weak compression spring 166 surrounds the rod 163 and is confined between a collar 165 on the rod 163 and the bearing 164. This spring 166 tends always to slide the member 161 into the position shown so as to normally cause the rotation of the gears 151 and to cause the operation of the mechanism connected thereto. Loosely mounted on shaft 16 is placed an eccentric 170 having a strap 170ᵃ of any ordinary design. Eccentric 170 has a clutch member 171 engageable with member 161 of the clutch when the member 161 is moved to the left in Fig. 12. This movement of member 161 to the left is accomplished by a cam 180 on a gear 181 which is rotated by engagement with a gear 182 mounted directly on shaft 16. A cam follower 183 is mounted on the end of a bar 184 which slides in a suitable bearing 185, and the action of the cam is to push the bar 184 to the left in Figs. 5 and 12. Bar 184 is not rigidly connected with bar 163, but connection is effected through the medium of a spring 186 of somewhat greater strength than spring 166. The spring 186 is normally uncompressed and rests inside a sleeve 187 on bar 184 and bears against the collar 165 on bar 163. When bar 184 is moved toward the left the clutch member 161 will also be moved toward the left providing clutch member 171 is in such a position as to allow that movement. If the clutch member 171 should not be in such position, then the spring 186 will be compressed until the clutch member 161 is rotated so that it may pass further to the left by properly engaging member 171. When this action has taken place, the eccentric 170 immediately begins revolving with shaft 16. A rod 190 is connected to the eccentric strap 170ᵃ and extends upwardly and connects at 191 with an oscillating arm 192 loosely mounted on shaft 111. Arm 192 is placed between two wheels 193 and 194 both rigidly mounted on shaft 111. Wheel 193 is provided with ratchet teeth with which a pawl 195 also mounted on arm 192 is adapted to engage. The teeth on ratchet wheel 193 are spaced apart a quarter revolution and the movement imparted to arm 192 is such as to move the wheel 193, and with it the shaft 111, through a quarter revolution upon each revolution of eccentric 170. The eccentric movement is preferably in excess of the actual movement required to rotate the ratchet wheel through a quarter revolution, and this excessive movement is taken up by a certain free movement of pawl 195 before engaging with one of the ratchet teeth. Wheel 194 is provided with four notches 196 into which the end 197 of a small pawl 198 is adapted to drop and hold the wheel from rotation. Pawl 198 is pivoted at 199 on box 60 and has a portion 200 extending on the opposite side of pivot 199 from end 197. A small spring pressed catch 201 is adapted to engage with the end 200 when the arm 192 moves in the direction indicated by the arrow and to lift the end 197 of the arm out of engagement with the notch 196. When this has been done, and before the spring pressed catch 201 passes off the end 200, the pawl 195 engages with a ratchet tooth of ratchet wheel 193 and starts the rotation of shaft 111. And the continued downward movement of arm 192 causes the spring pressed catch 201 to pass off the end 200 of pawl 198 and allows the end 197 to drop back into position to catch in the next notch 196. On the return movement of arm 192 to its normal position (shown in Fig. 15) the catch 201 is provided with a beveled end which causes it to be pushed inwardly and to then spring outwardly over the end 200 ready for the next operation.

Cam 180 is of sufficient length to cause the engagement of members 161 and 171 throughout a complete revolution of the shaft 16; so that the eccentric 170 is turned through one complete revolution upon each operation. The gears 182 and 181 are so proportioned that, when the member 161 of clutch 152 is pressed to the left by the cam 180, the gears 151 will be left in their positions except that the members 100 carrying prongs 99 will be in position to withdraw the prongs 99 from the box 80. We have hereinbefore said that it is preferable to have the relative rotations of shafts 102 and gears 151 measured by a whole number; and if gears 181 and 182 bear simple relations to each other, then it is easily fixed that the cam follower 183 shall be raised by the cam 180 just when the prongs 99 are in their outward position. When the clutch member 161 comes back to its normal position, the shaft 111 has been turned through a quarter revolution and the bunch of beans resting upon one of the members 110 has been dropped on to the conveyer belt 120.

To provide for separating the bunch of beans within the box 80 from the beans being forced through the trough 70, we have provided the prongs 90 situated as hereinbefore explained. These prongs are all mounted on members 220, one on each side of the machine, and these members slide inwardly and outwardly on guide rods 221. They are moved inwardly and outwardly through the medium of arms 222 pivoted at 223, as best shown in Fig. 8, and have extensions 224 between which a tension spring 224ª is connected to normally pull the arms to the positions illustrated and to hold the prongs 90 out of the trough. Cables 225 and 226 pass over pulleys 227 and 228 in such a manner that, when the cable 229, to which cables 225 and 226 are connected, is pulled in the direction indicated, the arms 22 are pulled toward each other and the prongs 90 are moved into the trough over the opening 81 therein. Cable 229 is attached to the eccentric 170 so that the revolution of the eccentric will cause the pulling of the cable and the operation of the prongs as described. This will occur at the same time that the members 110 are rotated and the bundle of beans is dropped out of the box. In the box we have stationarily mounted a knife member 230 which coöperates with members 231 on the ends of members 110. When the members 110 revolve and the beans in the trough 70 are held by the prongs 90, the vines from the trough are prevented from passing down into the box and those which are partially in the box and in the trough are stretched out by the rotating action of the members 110; and being in a stretched condition they are the more easily cut by the members 230 and 231. Being cut by these members, the bundle of vines which was in the box is allowed to easily drop on to the conveyer.

The conveyer ejector is composed of a belt 120 traveling over rollers 121, these rollers being supported on a frame 122 which itself is pivotally supported at 123 so that the whole conveyer may be turned about the pivot 123 to throw the rear end of the conveyer either to one side or the other of the machine. In Figs. 9 and 10 we have shown a means of driving the conveyer in the direction indicated. A vertical shaft 250 passes up through the axis 123 and is provided with bevel gears 251 and 252 on its upper and lower ends. A gear 253 is mounted on a horizontal shaft 254 and meshes with gear 251; and a belt connection 255 is placed between shaft 254 and one of rollers 121. The bevel gear 252 on the lower end of shaft 250 is driven through a shaft 256 having a gear 257 meshing with the gear 252, the shaft 256 having a flexible shaft connection 259 with a small gear 258 meshing with gear 50 on the wheel 12.

Having described our invention, we claim:

1. In combination, a bundling box, means for bunching vines therein, a movable bottom adapted to discharge the bunch from the box, and a conveyer belt pivoted below the box to swing in a horizontal plane.

2. In combination, a bundling box, a bottom for the box revoluble about one of its edges, means for bunching vines within the box, means for intermittently revolving the box bottom, and a conveyer arranged beneath the box adjustable to carry in one of several horizontal directions.

3. In combination, a bundling box, means for bunching vines or the like within the box, means for discharging bundles from the box, and a conveyer having a conveying movement substantially in a horizontal plane adapted to receive the discharge bundles from the box and adjustable to carry the bundles in any one of several horizontal directions.

4. In combination, a bundling box having an open top and a bottom formed by members revoluble about an axis near the edge of the box, means to intermittently revolve the bottom members, means to bunch vines or the like within the box, and a conveyer arranged below the box and adapted to carry the bundles horizontally therefrom.

5. In combination, a bundling box having an open top, a shaft along one lower edge of the box, members arranged on and projecting symmetrically from said shaft and normally standing in such position that one forms the box bottom while another forms a side of the box, means to bunch vines or the like within the box, means to intermittently rotate the shaft and members through distances corresponding to the distances between the members, and a horizontal conveyer arranged below the box, said conveyer being adjustable to carry bundles horizontally from a point beneath the box in any of several directions.

6. In a device of the character described, a bundling box open at its top, a rotatable shaft along one lower edge of the box, members projecting therefrom and spaced equally from each other around the shaft and being normally in such position that one forms the bottom of the box while another forms one side thereof, means to bunch vines or the like within the box and means to intermittently rotate the shaft and members.

7. In a device of the character described, a bundling box open at its top, a rotatable shaft along one lower edge of the box, members projecting therefrom and spaced equally from each other around the shaft and being normally in such position that one forms the bottom of the box while another forms one side thereof, means to bunch vines or the like within the box, coöperating vine cutters carried by the box and said members.

In witness that we claim the foregoing we have hereunto subscribed our names this eleventh day of November, 1911.

CHARLES R. KELLER.
OTTO O. KELLER.

Witnesses:
T. F. McFarland,
Geo. E. Hume.